(12) United States Patent
Yokoo et al.

(10) Patent No.: US 10,137,758 B2
(45) Date of Patent: Nov. 27, 2018

(54) VEHICLE AIR CONDITIONER

(71) Applicant: DENSO CORPORATION, Kariya, Aichi-pref. (JP)

(72) Inventors: Yasuhiro Yokoo, Kariya (JP);
Terukazu Higuchi, Okazaki (JP);
Yoshinori Yanagimachi, Takahama (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 147 days.

(21) Appl. No.: 14/428,855

(22) PCT Filed: Sep. 5, 2013

(86) PCT No.: PCT/JP2013/005274
§ 371 (c)(1),
(2) Date: Mar. 17, 2015

(87) PCT Pub. No.: WO2014/045537
PCT Pub. Date: Mar. 27, 2014

(65) Prior Publication Data
US 2015/0239322 A1    Aug. 27, 2015

(30) Foreign Application Priority Data

Sep. 18, 2012    (JP) ................................ 2012-203833

(51) Int. Cl.
*B60H 1/00* (2006.01)
*F25B 5/04* (2006.01)
(Continued)

(52) U.S. Cl.
CPC ..... *B60H 1/00907* (2013.01); *B60H 1/00921* (2013.01); *B60H 1/00964* (2013.01);
(Continued)

(58) Field of Classification Search
CPC ............ B60H 1/00735; B60H 1/00764; B60H 1/00907; B60H 1/00921; B60H 1/00964;
(Continued)

(56) References Cited

U.S. PATENT DOCUMENTS 4,228,511 A * 10/1980 Simcoe ............... G05D 23/1905
165/257
4,858,677 A * 8/1989 Doi ..................... B60H 1/00828
165/202

(Continued)

FOREIGN PATENT DOCUMENTS

| JP | 3538845 B2 | 6/2004 |
| JP | 2011016446 A | 1/2011 |
| JP | 2013052809 A | 3/2013 |

OTHER PUBLICATIONS

Fitzpatrick; Jason. "Lifehacker—How Can I Defog My Car Windows Quicker?". Captured on Wayback published on Feb. 13, 2010. Website: http://lifehacker.com/5437104/how-can-i-defog-my-car-windows-quicker.*

(Continued)

*Primary Examiner* — Larry Furdge
(74) *Attorney, Agent, or Firm* — Harness, Dickey & Pierce, P.L.C.

(57) ABSTRACT

A vehicle air conditioner includes a heat pump cycle and a refrigerant-circuit controller. The heat pump cycle includes an inside heat exchanger and a refrigerant-circuit switching device. The inside heat exchanger performs heat exchange between a refrigerant and a blown air that is to be blown into a vehicle compartment. The refrigerant-circuit switching device switches between a refrigerant circuit of a cooling mode and a refrigerant circuit of a non-cooling mode. The refrigerant-circuit controller selects the cooling mode or the non-cooling mode based on an air-conditioning load, the refrigerant-circuit controller controlling an operation of the (Continued)

refrigerant-circuit switching device. Upon selecting the non-cooling mode, the refrigerant-circuit controller starts performing a cooling-mode unallowable control in which the refrigerant circuit of the cooling mode is prohibited from being selected regardless of the air-conditioning load.

12 Claims, 6 Drawing Sheets

(51) Int. Cl.
  *F25B 6/04* (2006.01)
  *F25B 49/02* (2006.01)
  *B60H 1/32* (2006.01)
  *B60H 1/22* (2006.01)
(52) U.S. Cl.
  CPC ........... *B60H 1/3205* (2013.01); *F25B 5/04* (2013.01); *F25B 6/04* (2013.01); *F25B 49/02* (2013.01); *B60H 2001/2228* (2013.01); *F25B 2400/0409* (2013.01); *F25B 2400/0411* (2013.01); *F25B 2600/021* (2013.01); *F25B 2600/2501* (2013.01); *F25B 2700/1931* (2013.01); *F25B 2700/2104* (2013.01); *F25B 2700/2106* (2013.01); *F25B 2700/2117* (2013.01); *F25B 2700/21152* (2013.01)
(58) Field of Classification Search
  CPC . B60H 1/3205; B60H 2001/2228; F25B 5/04; F25B 6/04; F25B 49/02; F25B 2400/0409; F25B 2400/0411; F25B 2600/2501; F25B 2700/1931; F25B 2700/2104; F25B 2700/2106; F25B 2700/21152; F25B 2700/2117
  USPC .............................................. 165/202; 62/158
  See application file for complete search history.

(56) References Cited

U.S. PATENT DOCUMENTS

| | | | | |
|---|---|---|---|---|
| 5,167,129 | A * | 12/1992 | Akasaka | B60H 1/008 165/43 |
| 5,299,431 | A | 4/1994 | Iritani et al. | |
| 5,483,805 | A * | 1/1996 | Fujii | B60H 1/00392 62/158 |
| 5,971,066 | A * | 10/1999 | Oehring | B60H 1/00785 165/202 |
| 6,077,158 | A * | 6/2000 | Lake | B60H 1/00278 165/249 |
| 6,112,807 | A * | 9/2000 | Dage | B60H 1/3207 165/202 |
| 2001/0035286 | A1 * | 11/2001 | Kobayashi | B60H 1/3207 165/202 |
| 2004/0129007 | A1 * | 7/2004 | Tomita | B60H 1/00064 62/157 |
| 2010/0326127 | A1 * | 12/2010 | Oomura | B60H 1/00785 62/498 |
| 2011/0005255 | A1 | 1/2011 | Tanihata et al. | |
| 2013/0055746 | A1 | 3/2013 | Yokoo et al. | |

OTHER PUBLICATIONS

International Search Report and Written Opinion (in Japanese with English Translation) for PCT/JP2013/005274, dated Oct. 22, 2013; ISA/JP.

* cited by examiner

VEHICLE AIR CONDITIONER

CROSS REFERENCE TO RELATED APPLICATIONS

This application is a U.S. National Phase Application under 35 U.S.C. 371 of International Application No. PCT/JP2013/005274 filed on Sep. 5, 2013 and published in Japanese as WO 2014/045537 A1 on Mar. 27, 2014. This application is based on and claims the benefit of priority from Japanese Patent Application No. 2012-203833 filed on Sep. 18, 2012. The entire disclosures of all of the above applications are incorporated herein by reference.

TECHNICAL FIELD

The present disclosure relates to a vehicle air conditioner including a heat pump cycle that cools or heats air to be blown into a vehicle compartment.

BACKGROUND ART

Conventionally, such kind of a vehicle air conditioner is described in Patent Document 1. In the conventional technology, a heat pump cycle includes an inside condenser and an inside evaporator as inside heat exchangers that heat or cool a blown air, and is configured to be capable of switching between a refrigerant circuit that cools the blown air in the inside evaporator in a cooling mode and a refrigerant circuit that heats the blown air in the inside condenser in a heating mode.

The cooling mode and the heating mode are switched therebetween automatically and selectively base on an outside air temperature, a setting temperature, a solar radiation amount, an in-vehicle temperature and a state of an air conditioning switch.

PRIOR ART DOCUMENT

Patent Document

Patent Document 1: Japanese Patent No. 3538845

SUMMARY OF THE INVENTION

However, according to studies of inventors of the present application, in the above-described conventional technology, the cooling mode may be changed to the heating mode sometimes in accordance with a surrounding environment or an occupant's operation especially in a middle-temperature season such as a spring or an autumn.

In the cooling mode, the blown air is cooled to be lower than or equal to a dew point temperature in the inside evaporator (inside heat exchanger), and a condensed water is accordingly produced on a surface of the inside evaporator. Hence, when the cooling mode is switched to the heating mode, the condensed water on the surface of the inside evaporator may evaporate to be blown into the vehicle compartment in the heating mode, thereby causing window fogging or odor generation.

In consideration of the above-described points, it is an objective of the present disclosure to limit window fogging and odor generation due to an evaporation of condensed water attached to an inside heat exchanger.

According to an aspect of the present disclosure, a vehicle air conditioner includes: a heat pump cycle including an inside heat exchanger performing heat exchange between a refrigerant and a blown air that is to be blown into a vehicle compartment, and a refrigerant-circuit switching device that switches between a refrigerant circuit of a cooling mode in which the blown air is cooled in the inside heat exchanger and a refrigerant circuit of a non-cooling mode in which the blown air passes through the inside heat exchanger without being cooled; and a refrigerant-circuit controller that controls an operation of the refrigerant-circuit switching device. The refrigerant-circuit controller performs a cooling-mode unallowable control in which the refrigerant circuit of the cooling mode is prohibited from being selected after the non-cooling mode is selected during a predetermined time period.

Accordingly, the switching from the refrigerant circuit of the cooling mode to the refrigerant circuit of the non-cooling mode can be limited, and thus window fogging or odor generation caused by evaporation of condensed water attached to the inside heat exchanger can be limited.

Since the "cooling mode" in the present disclosure is an operation mode in which the blown air is cooled in the inside heat exchanger, the "cooling mode" includes, for example, an operation mode (dehumidifying-heating mode) in which the blown air that has been cooled in the inside heat exchanger is reheated to be blown into the vehicle compartment.

On the other hand, the "non-cooling mode" in the present disclosure is an operation mode in which the blown air is not cooled in the inside heat exchanger. The "non-cooling mode" may be an operation mode in which a temperature regulation of the blown air other than the cooling of the blown air is performed in the inside heat exchanger. The "non-cooling mode" includes an operation mode in which the blown air is heated in the inside heat exchanger, and an operation mode (air blowing mode) in which neither cooling nor heating of the blown air is performed in the inside heat exchanger.

EMBODIMENTS FOR EXPLOITATION OF THE INVENTION

Figure 1:
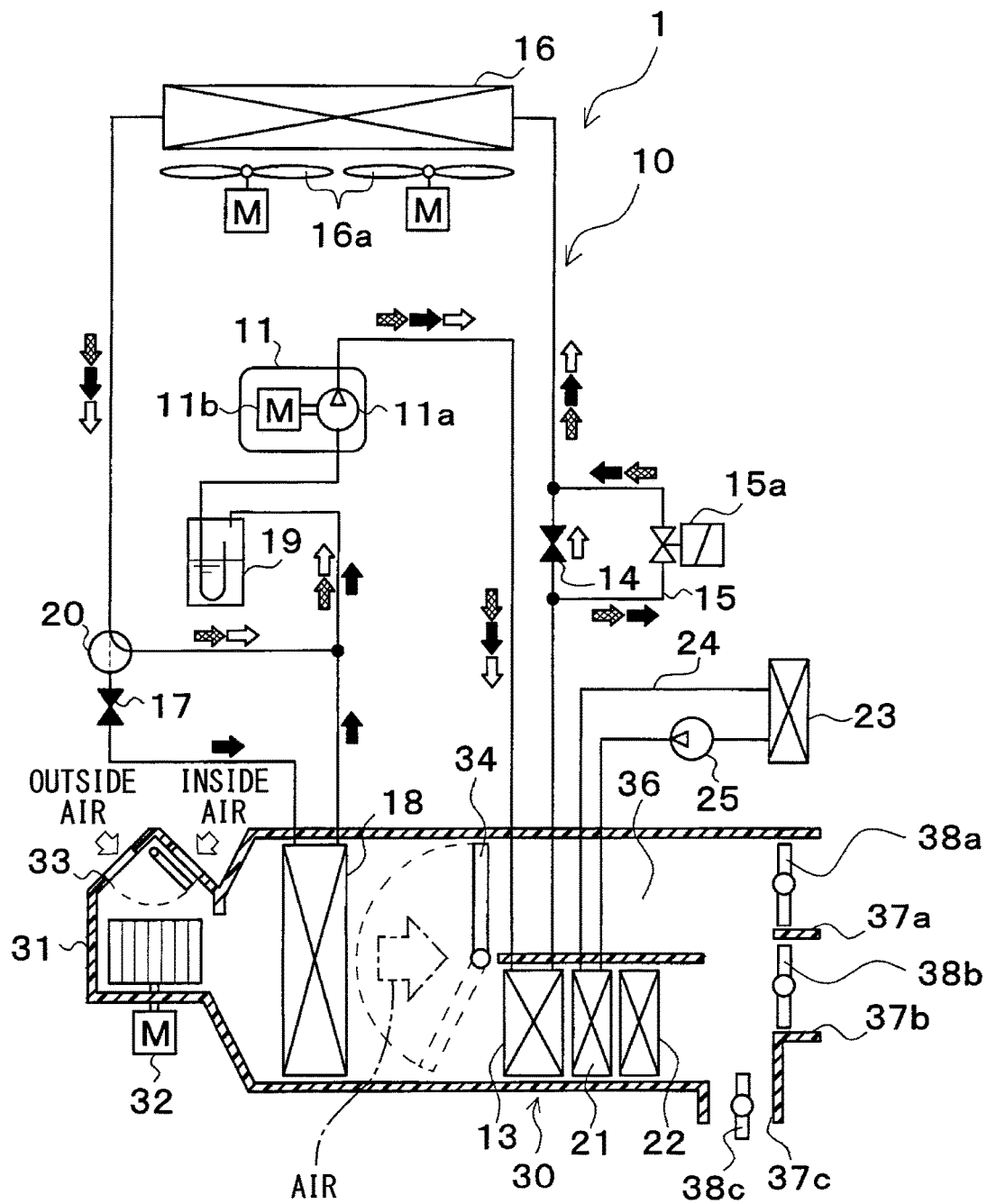
FIG. 1 is a schematic diagram showing a vehicle air conditioner according to an embodiment of the present disclosure.

An embodiment will be described below with reference to FIGS. 1 to 6. A vehicle air conditioner 1 of the present embodiment is used for an electric vehicle that obtains a driving force for running from a for-running electric motor. In the electric vehicle, electricity is supplied from an external power source (commercial power source) to a battery B that is an electric storage device at a stop time of the vehicle, and the electricity stored in the battery B is supplied to the for-running electric motor to drive the vehicle at a running time of the vehicle.

Further, in the electric vehicle of the present embodiment, the electricity (electric energy) stored in the battery B is supplied to a variety of electric components of the vehicle air conditioner 1 through a later-described air-conditioning controller 50, thereby operating the vehicle air conditioner 1. In other words, the vehicle air conditioner 1 of the present embodiment is operated by the supply of electricity stored in the battery B.

Next, detailed configurations of the vehicle air conditioner 1 will be described referring to FIGS. 1 and 2. The vehicle air conditioner 1 includes a heat pump cycle 10 (vapor-compression refrigeration cycle) used as a temperature regulation device that regulates a temperature of an air blown into a vehicle compartment, an inside air-conditioning unit 30 for blowing the air that has been regulated in temperature by the heat pump cycle 10 into the vehicle compartment, and the air-conditioning controller 50 that controls operations of the variety of electric components of the vehicle air conditioner 1.

Firstly, the heat pump cycle 10 is configured to be capable of switching among a refrigerant circuit of a heating mode in which the blown air is heated to heat the vehicle compartment, a refrigerant circuit of a cooling mode in which the blown air is cooled to cool the vehicle compartment, and a refrigerant circuit of a defrosting mode in which a frost is removed when the frost is produced on an outside heat exchanger 16 functioning as an evaporator that evaporates a refrigerant in the heat pump cycle 10 in the heating mode.

Figure 2:
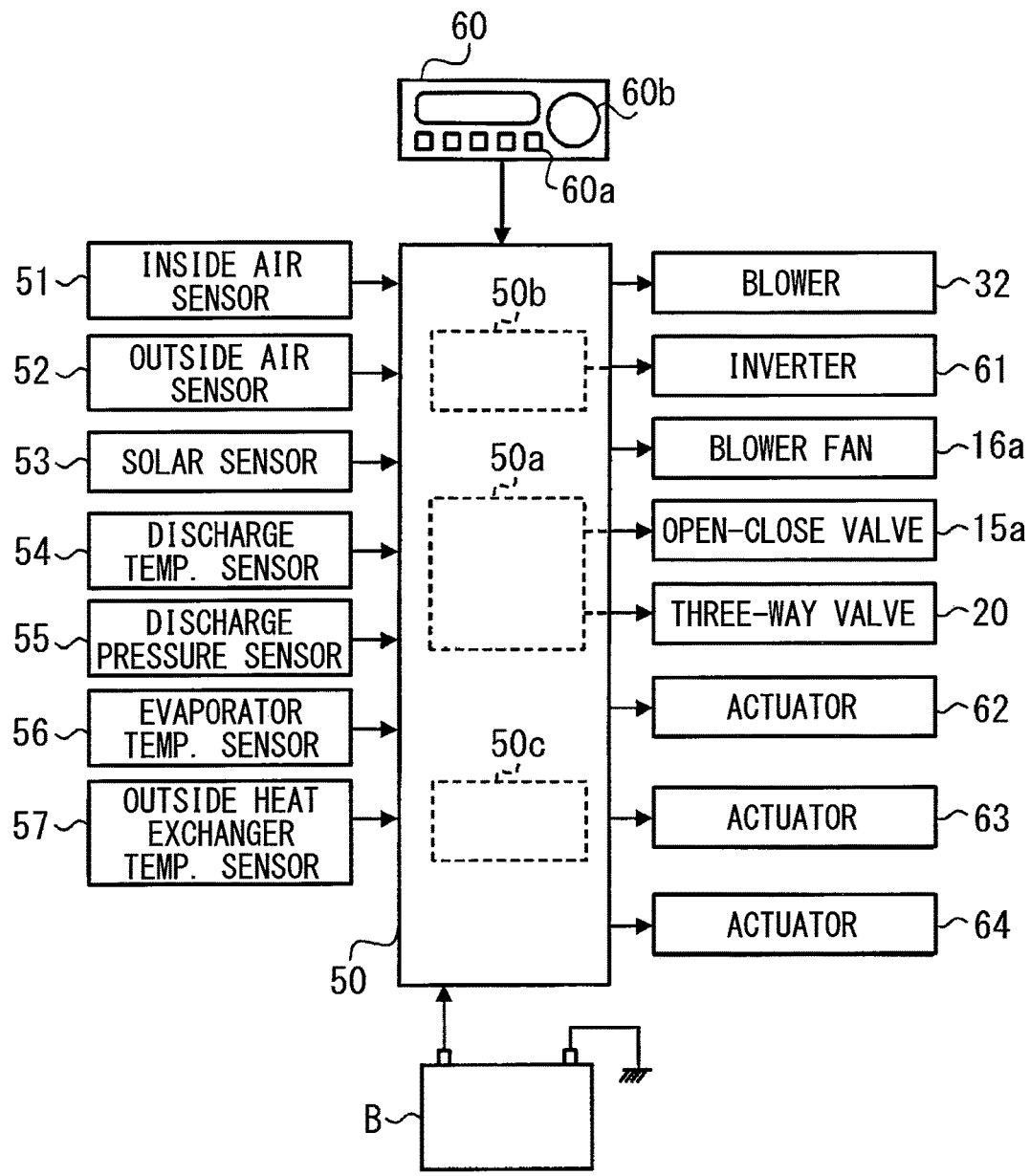
FIG. 2 is a schematic diagram showing an electric control portion of the vehicle air conditioner according to the embodiment.

In FIG. 1, a refrigerant flow in the heating mode is shown by white arrows, a refrigerant flow in the cooling mode is shown by black arrows, and a refrigerant flow in the defrosting mode is shown by crosshatched arrows.

The heat pump cycle 10 includes a compressor 11 that compresses and discharges a refrigerant, an inside condenser 13 and an inside evaporator 18 as inside heat exchangers that heat or cool a blown air, a heating fixed throttle 14 and a cooling fixed throttle 17 as decompression devices that decompress and expand the refrigerant, and an open-close valve 15a and a three-way valve 20 as an example of a refrigerant-circuit switching device.

The heat pump cycle 10 uses an HFC refrigerant (e.g., R134a) as refrigerant and acts as a vapor-compression subcritical refrigeration cycle in which a high pressure-side refrigerant pressure does not exceed a critical pressure of the refrigerant. HFO refrigerant (e.g., R1234yf) may be adopted. Further, refrigerant oil for lubricating the compressor 11 is mixed into the refrigerant, and a part of the refrigerant oil circulates in the cycle together with the refrigerant.

The compressor 11 is disposed inside a vehicle hood that is located outside the vehicle compartment. The compressor 11 draws, compresses and discharges the refrigerant in the heat pump cycle 10. The compressor 11 is configured as an electric compressor in which a fixed-capacity compression mechanism 11a having a fixed discharge capacity is driven by an electric motor 11b. A variety of compression mechanisms, such as a scroll compression mechanism or a bane compression mechanism, may be adopted as the fixed-capacity compression mechanism 11a, more specifically.

The electric motor 11b is an alternating-current motor in which its operation (rotation rate) is controlled by an alternating-current voltage outputted from an inverter 61. The inverter 61 outputs an alternating-current voltage having a frequency dependent on a control signal outputted from the air-conditioning controller 50. By this control of the frequency (rotation rate), a refrigerant discharge capacity of the compressor 11 is changed. Therefore, the electric motor 11b acts as a discharge capacity changing device of the compressor 11.

A discharge port side of the compressor 11 is connected to a refrigerant inlet side of the inside condenser 13. The inside condenser 13 is disposed in a casing 31 that defines an air passage of air blown into the vehicle compartment in the inside air-conditioning unit 30. The inside condenser 13 is a heating heat exchanger that heats the blown air via heat exchange between the blown air and the refrigerant flowing through an inside of the inside condenser 13.

A refrigerant outlet side of the inside condenser 13 is connected to a refrigerant inlet side of the outside heat exchanger 16 through the heating fixed throttle 14. An orifice or a capillary tube, for example, may be adopted as the heating fixed throttle 14. A variable throttle mechanism such as an electric expansion valve having a fully-open function may be adopted as the heating fixed throttle 14 as long as the heating fixed throttle 14 is capable of decompressing the refrigerant in the heating mode.

In the present embodiment, a bypass passage 15 is provided, which leads the refrigerant flowing out of the inside condenser 13 toward the refrigerant inlet side of the outside heat exchanger 16 with bypassing the heating fixed throttle 14. In the bypass passage 15, the open-close valve 15a which opens or closes the bypass passage 15 is disposed.

The open-close valve 15a is an example of the refrigerant-circuit switching device that switches among the refrigerant circuit in the cooling mode, the refrigerant circuit in the heating mode, and the refrigerant circuit in the defrosting mode. The open-close valve 15a is an electromagnetic valve in which its operation is controlled by a control signal outputted from the air-conditioning controller 50. More specifically, the open-close valve 15a of the present embodiment is open in the cooling mode and the defrosting mode, and is closed in the heating mode.

A pressure loss, which is produced when the refrigerant passes through the bypass passage 15 in a state where the open-close valve 15a is open, is significantly smaller than a pressure loss, which is produced when the refrigerant passes through the heating fixed throttle 14 in a state where the open-close valve 15a is closed. Therefore, in the state where the open-close valve 15a is open, a nearly total flow rate of the refrigerant flowing out of the outside heat exchanger 16 through the bypass passage 15 flows to the refrigerant inlet side of the outside heat exchanger 16.

The outside heat exchanger 16 is disposed inside the vehicle hood and performs heat exchange between the refrigerant flowing in the outside heat exchanger 16 on a downstream side of the inside condenser 13 and an air (outside air) blown by a blower fan 16a outside the vehicle compartment. The blower fan 16a is an electric blower in which its rotation rate (air blowing capacity) is controlled by a control voltage outputted from the air-conditioning controller 50.

A refrigerant outlet side of the outside heat exchanger 16 is connected to the three-way valve 20 and is an example of the refrigerant-circuit switching device that switches among the refrigerant circuits of the respective operation modes together with the open-close valve 15a. The three-way valve 20 is an electric three-way valve in which its operation is controlled by a control signal outputted from the air-conditioning controller 50.

More specifically, the three-way valve 20 selects a refrigerant circuit connecting the refrigerant outlet side of the outside heat exchanger 16 and the cooling fixed throttle 17 in the cooling mode, and selects a refrigerant circuit connecting the refrigerant outlet side of the outside heat exchanger 16 and a refrigerant inlet side of an accumulator 19 disposed on a suction side of the compressor 11 in the heating mode and the defrosting mode.

The cooling fixed throttle 17 is a decompression device having a similar configuration to that of the heating fixed throttle 14. The inside evaporator 18 is disposed on an upstream side of the inside condenser 13 in a flow of the blown air in the casing 31 of the inside air-conditioning unit 30. The inside evaporator 18 may be used as an example of an inside heat exchanger that performs heat exchange between the refrigerant flowing through the inside evaporator 18 and the blown air. More specifically, the inside evaporator 18 is an example of a cooling heat exchanger that cools the blown air via heat exchange between the refrigerant and the blown air. The three-way valve 20 is positioned on an upstream side of the inside evaporator 18 in a refrigerant flow and switches the refrigerant circuit.

A refrigerant outlet side of the inside evaporator 18 is connected to the inlet side of the accumulator 19. The accumulator 19 separates the refrigerant flowing therein into gas and liquid and stores an excess refrigerant of the cycle. Further, a gas-refrigerant outlet of the accumulator 19 is connected to the suction port side of the compressor 11.

Next, the inside air-conditioning unit 30 will be described. The inside air-conditioning unit 30 is disposed on an inner side of a dashboard panel (instrument panel) located in a front end part of the vehicle compartment. The inside air-conditioning unit 30 is configured to house, for example, a blower 32, the above-described inside evaporator 18, the inside condenser 13 and an air mix door 34 inside the casing 31 that acts as an outer shell of the inside air-conditioning unit 30.

The casing 31 is made of resin (e.g., polypropylene) having a certain level of elasticity and superior in strength, and defines the air passage of the blown air that is to be blown into the vehicle compartment. Disposed on a most upstream side of the casing 31 in flow of the blown air is an inside-outside air switching device 33 as an inside-outside switching device that selectively introduces an inside air (air inside the vehicle compartment) and an outside air (air outside the vehicle compartment) into the casing 31.

The inside-outside air switching device 33 continuously adjusts an opening area of an outside-air introduction port, through which the outside air is introduced into the casing 31, and an opening area of an inside-air introduction port, through which the inside air is introduced into the casing 31, by using an inside-outside air switching door. Accordingly, the inside-outside air switching device 33 continuously changes a ratio between a flow rate of the inside air and a flow rate of the outside air. The inside-outside switching door is driven by an electric actuator 62 for the inside-outside switching door, and an operation of the electric actuator 62 is controlled by a control signal outputted from the air-conditioning controller 50.

Disposed on a downstream side of the inside-outside air switching device 33 in the air flow is a blower 32 that blows air drawn via the inside-outside air switching device 33 toward the inside of the vehicle compartment. The blower 32 is an electric blower in which a centrifugal multi-blade fan (sirocco fan) is driven by an electric motor, and a rotation rate (air blowing amount) is controlled by a control voltage outputted from the air-conditioning controller 50.

On a downstream of the blower 32 in the air flow, the inside evaporator 18 and the inside condenser 13 described above are disposed in an order: the inside evaporator 18 and the inside condenser 13 with respect to the flow of the blown air. In other words, the inside evaporator 18 is disposed on an upstream side of the inside condenser 13 in the air flow.

Disposed on a downstream side of the inside condenser 13 in the air flow are a heater core 21 and a PTC heater 22 as heating device that heat air which has passed through the inside evaporator 18. The heater core 21 functions as a heating device (heat exchange device) that heats the blown air, which has passed through the inside evaporator 18, by using hot water heated in a water-heating heater 23 as a heat medium.

The water-heating heater 23 is an electric heater that produces heat by a supply of electricity, and an operation of the water-heating heater 23 is controlled by a control signal outputted from the air-conditioning controller 50. The water-heating heater 23 may be, for example, a combustor that generates heat by combusting fuel.

The heater core 21 and the water-heating heater 23 are connected via a hot water pipe, thereby providing a coolant water circuit 24 through which the hot water circulates between the heater core 21 and the water-heating heater 23. In the coolant water circuit 24, a coolant water pump 25 is disposed to circulate the coolant water. The coolant water pump 25 is an electric water pump in which its rotation rate (circulation amount of the coolant water) is controlled by a control voltage outputted from the air-conditioning controller 50.

The PTC heater 22 includes a PTC element (positive coefficient thermistor) and generates heat by supply of electricity to the PTC element. The PTC heater 22 is an electric heater as a heating device that heats the air which has passed through the inside evaporator 18. An operation of the PTC heater 22 is controlled by a control signal outputted from the air-conditioning controller 50.

In the casing 31, the air mix door 34 is disposed, which regulates the blown air that has passed through the inside evaporator 18 into a flow-rate ratio between a flow rate of air passing through the inside condenser 13, the heater core 21 and the PTC heater 22 and a flow rate of air bypassing the inside condenser 13. The air mix door 34 is driven by an electric actuator 63 for driving the air mix door, and an operation of the electric actuator 63 is controlled by a control signal outputted from the air-conditioning controller 50.

Further, provided in a most downstream part of the casing 31 in the air flow are opening holes through which a blown air that has passed through the inside condenser 13, the heater core 21 and the PTC heater 22, and a blown air that has passed through a cool-air bypass passage 36 bypassing the inside condenser 13, the heater core 21 and the PTC heater 22, are blown into the vehicle compartment that is a space to be air-conditioned. Provided as the opening holes are, more specifically, a defroster opening hole 37a through which a conditioned air is blown toward an inner surface of a vehicle front window, a face opening hole 37b through which the conditioned air is blown toward an upper part of an occupant in the vehicle compartment, and a foot opening hole 37c through which the conditioned air is blown toward a foot area of the occupant.

Downstream sides of the defroster opening hole 37a, the face opening hole 37b and the foot opening hole 37c in the air flow are connected through ducts having air passages, respectively, to a defroster air outlet, a face air outlet and a foot air outlet (none of these are shown in the drawings) which are provided in the vehicle compartment.

In the cooling mode, an opening degree of the air mix door 34 is regulated, and accordingly, with respect to the blown air cooled in the inside evaporator 18, the flow-rate ratio between a warm air reheated in the inside condenser 13 and a cool air bypassing the inside condenser 13 is regulated. In accordance with the regulation of the flow-rate ratio, a temperature of mixture air of the warm air and the cool air, i.e. air blown into the vehicle compartment is regulated.

In the cooling mode, the air mix door 34 may be actuated to a position such that all the blown air that has passed through the inside evaporator 18 flows to the cool-air bypass passage 36 with bypassing the inside condenser 13.

Disposed on upstream sides of the defroster opening hole 37a, the face opening hole 37b and the foot opening hole 37c in the air flow are, respectively, a defroster door 38a that regulates an opening area of the defroster opening hole 37a, a face door 38b that regulates an opening area of the face opening hole 37b, and a foot door 38c that regulates an opening area of the foot opening hole 37c.

The defroster door 38a, the face door 38b and the foot door 38c act as an air-outlet-mode switching device that switches an air outlet mode and are coupled with an electric actuator 64 for driving the air-outlet-mode doors through a link mechanism or the like to be rotationally operated in conjunction with each other. An operation of the electric actuator 64 is also controlled by a control signal outputted from the air-conditioning controller 50.

The air outlet mode switched by the air-outlet-mode switching device includes a face mode in which the face air outlet is fully open and air is blown from the face air outlet toward an upper part of an occupant in the vehicle compartment, a bi-level mode in which both the face air outlet and the foot air outlet are open and air is blown toward the upper part and a foot area of the occupant in the vehicle compartment, a foot mode in which the foot air outlet is fully open while the defroster air outlet is slightly open and air is blown from the foot air outlet mainly, and a foot-defroster mode in which the foot air outlet and the defroster air outlet are open at a level comparable with each other and air is blown from both of the foot air outlet and the defroster air outlet.

Additionally, a defroster mode, in which the defroster air outlet is fully open and air is blown from the defroster air outlet toward the inner surface of the vehicle front window, can be selected by occupant's manual operation of an air outlet mode changeover switch provided on an operation panel.

Next, an electric control portion of the present embodiment will be described. The air-conditioning controller 50 shown in FIG. 2 includes a known microcomputer having a CPU, a ROM and a RAM, and peripheral circuits thereof. The air-conditioning controller 50 performs a variety of calculations and processing based on an air-conditioning control program stored in the ROM and controls a variety of air-conditioning equipment, such as the inverter of the compressor 11, the open-close valve 15a and the three-way valve 20 as an example of the refrigerant-circuit switching device, the blower fan 16a, the blower 32 and the above-described various electric actuators 62 to 64, connected to an output side of the air-conditioning controller 50.

Inputted to an input side of the air-conditioning controller 50 are detection signals from an air-conditioning control sensor group which includes an inside air sensor 51 as an inside-air-temperature detection device that detects a temperature Tr (inside air temperature) inside the vehicle compartment, an outside air sensor 52 as an outside-air-temperature detection device that detects a temperature Tam (outside air temperature) outside the vehicle compartment, a solar sensor 53 as a solar amount detection device that detects a solar radiation amount Ts thrown into the vehicle compartment, a discharge temperature sensor 54 that detects a refrigerant discharging temperature of refrigerant discharged from the compressor 11, a discharge pressure sensor 55 that detects a refrigerant discharging pressure Pd of refrigerant discharged from the compressor 11, an evaporator temperature sensor 56 that detects a refrigerant evaporation temperature TE (evaporator temperature) in the inside evaporator 18, and an outside heat exchanger temperature sensor 57 that detects an outside device temperature Tout of the outside heat exchanger 16.

The refrigerant discharging pressure Pd of the present embodiment is used as the high pressure-side refrigerant pressure in the cycle from the refrigerant discharge side of the compressor 11 to the inlet side of the cooling fixed throttle 17 in the cooling mode, or is used as the high pressure-side refrigerant pressure in the cycle from the refrigerant discharge side of the compressor 11 to the inlet side of the heating fixed throttle 14 in the heating mode.

The evaporator temperature sensor 56 of the present embodiment detects a temperature of a heat exchange fin of the inside evaporator 18, more specifically. The evaporator temperature sensor 56 may employ a temperature detector that detects a temperature of another part of the inside evaporator 18, or may employ a temperature detector that detects directly a temperature of the refrigerant flowing through the inside evaporator 18. These can be applied to the outside heat exchanger temperature sensor 57 as well.

Operation signals from a variety of air-conditioning control switches provided on the operation panel 60 that is disposed near the dashboard panel in the front part of the vehicle compartment are further inputted to the input side of the air-conditioning controller 50. The variety of air-conditioning control switches provided on the operation panel 60 are, for example, an air conditioner switch 60a that switches between operation and stop of the vehicle air conditioner 1, an automating switch that activates or deactivates an automatic control of the vehicle air conditioner 1, an operation mode changeover switch as an operation mode selecting device that switches the operation mode, the air outlet mode changeover switch that switches the air outlet mode, a blower switch that turns on or off the blower 32 and configures a flow rate thereof, a temperature setting switch 60b as a temperature setting device that sets a setting temperature Tset in the vehicle compartment, and an economy switch that is an energy-saving request device that requests reduction of energy consumed in air conditioning.

The air conditioner switch 60a is provided with an indicator (display device) that notifies an occupant of whether the inside evaporator 18 is cooling the blown air. More specifically, the indicator of the air conditioner switch 60a lights in a state where the refrigerant circulates in the inside evaporator 18 and the inside evaporator 18 cools the blown air, or blacks out in a state where the refrigerant does not circulate in the inside evaporator 18 and the inside evaporator 18 does not cool the blown air.

The air-conditioning controller 50 is configured to be integrated with a control device that controls the variety of air-conditioning components connected to the output side of the air-conditioning controller 50. A configuration (hardware and software) that controls an operation of each of the air-conditioning equipment is configured as a control device that controls each of the air-conditioning equipment.

For example, in the present embodiment, a portion (hardware and software) of the air-conditioning controller 50, which controls operations of the open-close valve 15a and the three-way valve 20 that are examples of the refrigerant-circuit switching device, is used as an example of a refrigerant-circuit controller 50a.

In the present embodiment, an air heating capacity of the inside condenser 13 is controlled by the operation control of the inverter 61 for the compressor 11. Therefore, a portion (hardware and software) of the air-conditioning controller 50, which controls an operation of the inverter 61 for the compressor 11, is used as an example of a first heating capacity controller 50b.

In the present embodiment, a portion (hardware and software) of the air-conditioning controller 50, which controls operations of the PTC heater 22 and the water-heating heater 23, is used as an example of a second heating capacity controller 50c that controls an air heating capacity of the PTC heater 22 and an air heating capacity of the heater core 21.

Next, with reference to FIGS. 3 to 6, operations of the vehicle air conditioner 1 of the present embodiment in the above-described configuration will be described. The control processing is executed even in the time of stop of the vehicle, if an electric power is being supplied from the battery B to the air-conditioning controller 50. The supply of the electric power from the battery B to the air-conditioning controller 50 starts when an ignition switch of the vehicle is turned on. The respective control steps of FIGS. 3 to 6 are configured as a device that fulfills various functions of the air-conditioning controller 50.

Firstly, at step S1, an initialization is preformed, such as initializing of flags, timer or the like, and setting of stepping motors of the above-described electric actuators to their initial positions. In the initialization, some of the flags and calculated values are maintained at values stored in a previous operation termination time of the vehicle air conditioner 1 or in a stop time of a vehicle system.

Next, at step S2, the air-conditioning controller 50 reads in operation signals or the like of the operation panel 60, and proceeds to step S3. At step S3, the air-conditioning controller 50 reads in signals of vehicle environmental conditions used for air-conditioning control, i.e. detection signals of the above-described air-conditioning control sensor group 51 to 57, and proceeds to step S4.

At step S4, the air-conditioning controller 50 calculates a target blowing temperature TAO of air (in-vehicle-compartment blown air) blown into the vehicle compartment. Therefore, a portion of the air-conditioning controller 50, which performs a control operation of step S4, is used as an example of a target blowing temperature determination portion that determines the target blowing temperature TAO of the air (in-vehicle compartment blown air) blown into the vehicle compartment.

The target blowing temperature TAO is a value determined to make the inside air temperature Tr approach the target temperature Tset desired by an occupant and is calculated by the following formula F1.

$$TAO = Kset \times Tset - Kr \times Tr - Kam \times Tam - Ks \times Ts + C \quad (F1)$$

Tset is set by the in-vehicle compartment temperature setting switch and is a target temperature in the vehicle compartment, Tr detected by the inside air sensor 51 and is a temperature (inside air temperature) in the vehicle compartment, Tam is detected by the outside air sensor 52 and is a temperature (outside air temperature) outside the vehicle compartment, and Ts is detected by the solar sensor 53 and is a solar radiation amount. Kset, Kr, Kam and Ks are control gains, and C is a constant number for correction.

The target blowing temperature TAO corresponds to an amount of heat that is required to be generated by the vehicle air conditioner 1 for keeping a desired temperature in the vehicle compartment. The target blowing temperature TAO can be considered as an air-conditioning load (air-conditioning heat load) required on the vehicle air conditioner 1.

The target blowing temperature TAO calculated by the above-described formula F1 is a control target value that can be used in both the cooling mode and the heating mode. The target blowing temperature TAO calculated by the above-described formula F1 may be corrected to be lowered slightly for reduction of consumed power in the heating mode.

Next, at step S5, the operation mode of the heat pump cycle 10 is determined. A detailed control of step S5 will be described with reference to FIG. 4. At step S501, the air-conditioning controller 50 determines whether the blower switch is turned on. When the blower switch is determined not to be turned on, the air-conditioning controller 50 proceeds to step S502 and sets the operation mode to the air blowing mode.

The air blowing mode is an operation mode in which the blown air is just blown into the vehicle compartment without being heated or cooled. More specifically, an electric supply to the open-close valve 15a and the three-way valve 20 which are an example of the coolant circuit switching device is shut off, and the compressor 11 is stopped.

At next step S503, the indicator of the air conditioner switch 60a is determined to be off (black out), and the air-conditioning controller 50 proceeds to step S6.

When the blower switch is determined to be turned on, the air-conditioning controller 50 proceeds to step S504 and determines a provisional operation mode based on the outside air temperature and the target blowing temperature TAO.

Figure 4:
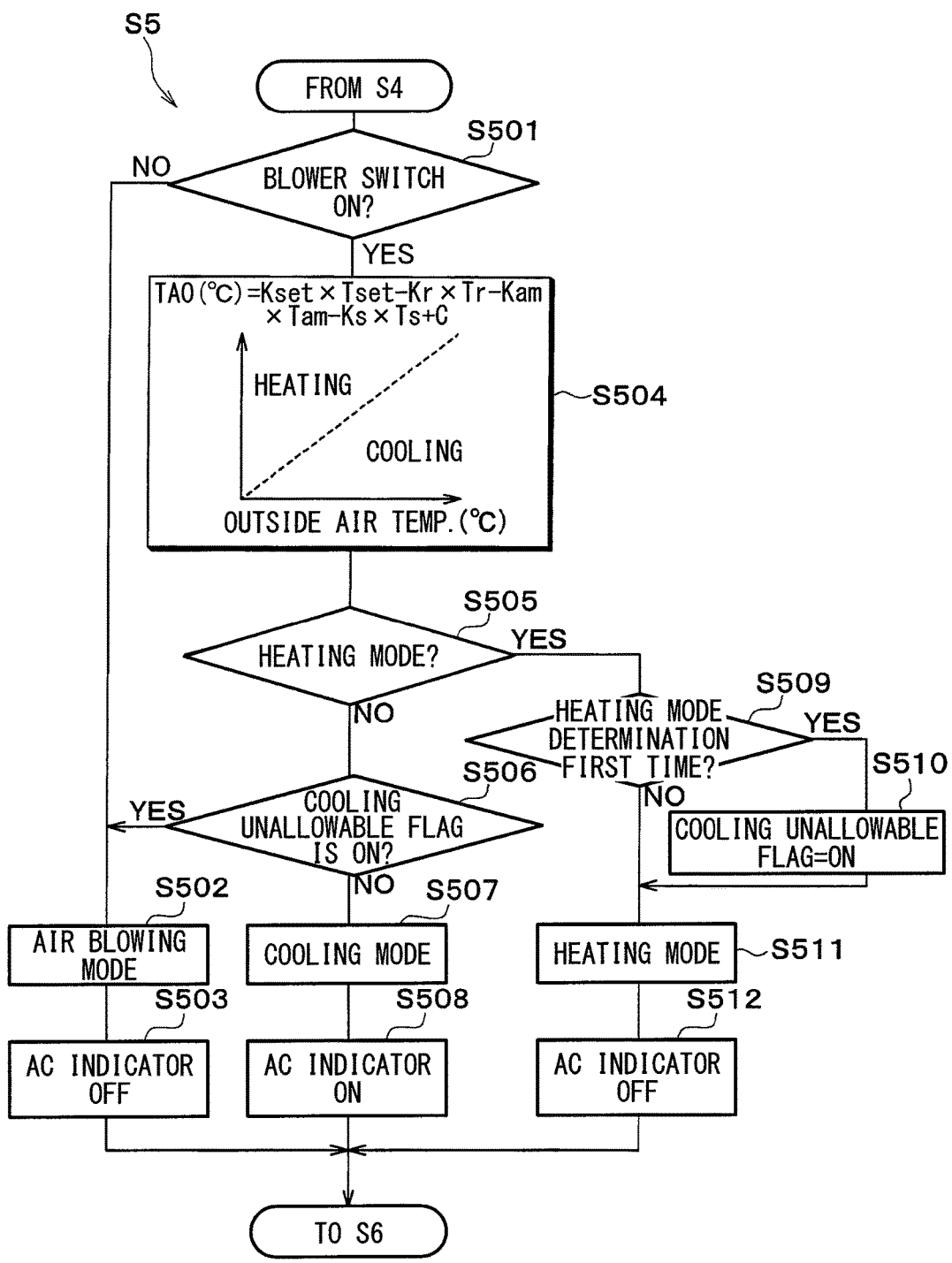
FIG. 4 is a flowchart showing a part of the control processing of the vehicle air conditioner according to the embodiment.

More specifically, as shown in a control characteristic diagram of step S504 of FIG. 4, the provisional operation mode is determined to be the cooling mode in a high-temperature side range in outside air temperature and a low-temperature side range in target blowing temperature TAO, or the provisional operation mode is determined to be the heating mode in a low-temperature side range in outside air temperature and a high-temperature side range in target blowing temperature TAO.

Next, at step S505, it is determined whether the provisional operation mode determined at step S504 is the heating mode. When the provisional operation is determined not to be the heating mode, the air-conditioning controller 50 proceeds to step S506 to determine whether a cooling unallowable flag is on. The cooling unallowable flag represents an execution of a cooling-mode unallowable control in which the refrigerant-circuit controller 50a does not allow the cooling mode to be selected. In other words, the cooling unallowable flag represents an execution of a cooling-mode unallowable control in which the cooling mode is prohibited from being selected.

When the cooling unallowable flag is determined to be on, the air-conditioning controller 50 proceeds to step S502 to determine the operation mode to be the air blowing mode, further proceeds to step S503 to turn off (black out) the indicator of the air conditioner switch 60a, and subsequently proceeds to step S6.

When the cooling unallowable flag is determined not to be on, the air-conditioning controller 50 proceeds to step S507 to determine the operation mode to the cooling mode. Next, at step S508, the indicator of the air conditioner switch 60a is determined to be turned on (light up), and the air-conditioning controller 50 proceeds to step S6.

When the provisional operation mode is determined to be the heating mode at step S505, the air-conditioning controller 50 proceeds to step S509 to determine whether it is the first time the provisional operation mode is determined to be the heating mode. More specifically, it is determined whether the provisional operation mode is determined to be the heating mode for the first time after a start of the operation of the heat pump cycle 10.

When it is determined to be the first time the provisional operation mode is determined to be the heating mode, the air-conditioning controller 50 proceeds to step S510 to turn the cooling unallowable flag on, and then proceeds to step S511. At step S511, the operation mode is determined to be the heating mode. Next, at step S512, the indicator of the air conditioner switch 60a is determined to be off (black out), the air-conditioning controller 50 proceeds to step S6.

When it is determined not to be the first time the provisional operation mode is determined to be the heating mode, in other words, when it is determined to be the second or more time the provisional operation mode is determined to be the heating mode after a start of the operation of the heat pump cycle 10, the air-conditioning controller 50 proceeds to step S511 without proceeding to step S510. Accordingly, the operation mode is determined to be the heating mode at step S511, and the indicator of the air conditioner switch 60a is determined to be off (black out) at step S512. The air-conditioning controller 50 proceeds to step S6, subsequently.

At step S5, the operation mode is switched to the defrosting mode when the outside heat exchanger 16 is frosted during the heating mode. In this determination of the frosting, the outside heat exchanger 16 is determined to be frosted when the outside device temperature Tout detected by the outside heat exchanger temperature sensor 57 becomes lower than or equal to a reference temperature (e.g., −10° C.) that is predetermined to be lower than or equal to 0° C.

At next steps S6 to S11, control conditions of the variety of air-conditioning components connected to the output side of the air-conditioning controller 50 are determined. Firstly, at step S6, a target air blowing amount of air blown by the blower 32, i.e. a blower-motor voltage applied to the electric motor of the blower 32 is determined.

A detailed control of step S6 is described with reference to FIG. 5. At step S61, it is determined whether the automating switch of the operation panel 60 is turned on. When the automating switch is determined not to be turned on at step S61, the air-conditioning controller 50 proceeds to step S62 and determines the blower-motor voltage corresponding to an air blowing amount that is set by an air-blowing-amount setting switch of the operation panel 60 to be that desired by an occupant. The air-conditioning controller 50 proceeds to step S7, subsequently.

More specifically, the air-blowing-amount setting switch of the present embodiment is capable of setting five levels of the air blowing amount: Lo, M1, M2, M3 and Hi, which are determined to increase in blower-motor voltage in an order: 4V, 6V, 8V, 10V and 12V.

When the automating switch is determined to be turned on at step S61, the air-conditioning controller 50 proceeds to step S63 and determines a blower level f(TAO) based on the target blowing temperature TAO determined at step S4 with reference to a control map that is stored in the air-conditioning controller 50 in advance.

Figure 5:
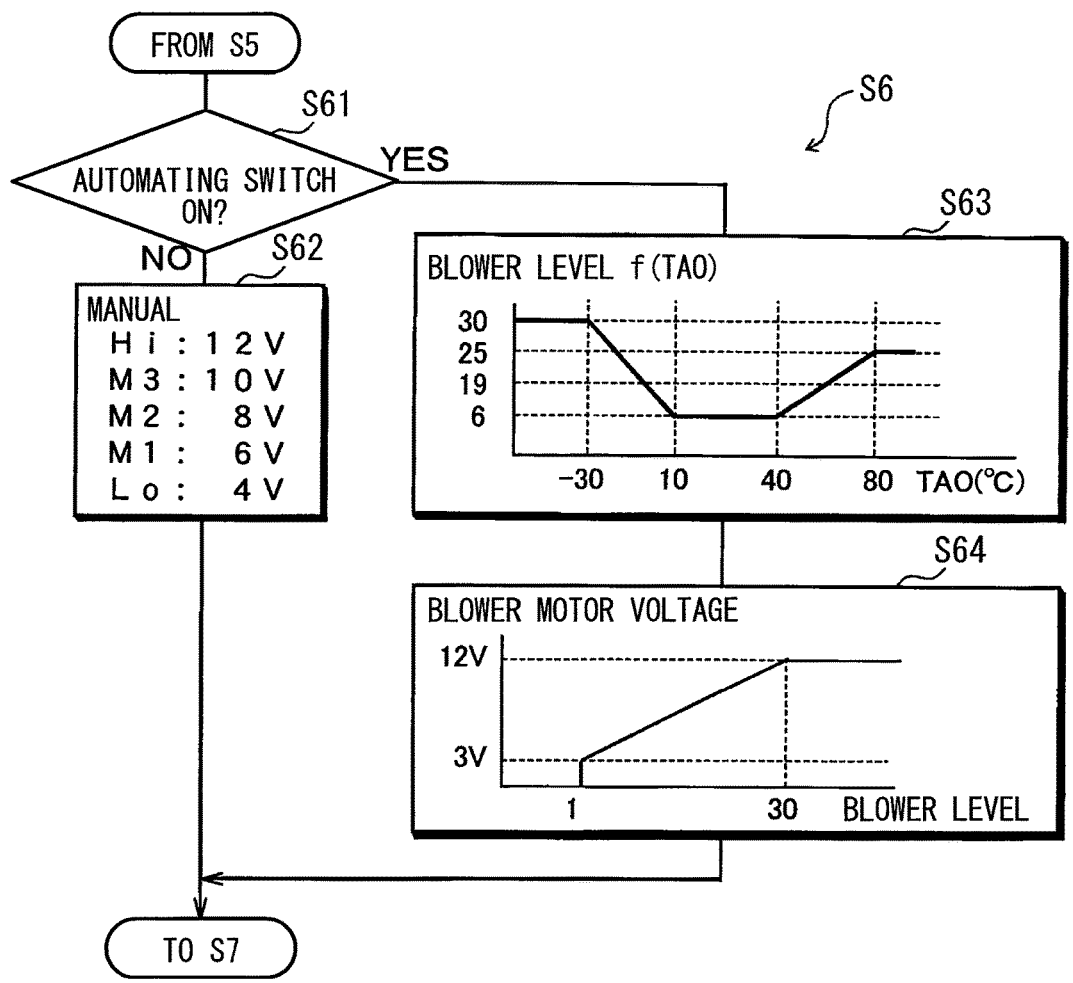
FIG. 5 is a flowchart showing a part of the control processing of the vehicle air conditioner according to the embodiment.

In details, as shown in a control characteristic diagram depicted in step S63 of FIG. 5, when the target blowing temperature TAO is within an extremely low temperature range (largest cooling range) or an extremely high temperature range (largest heating range), the air-conditioning controller 50 makes the blower level f(TAO) close to a largest value. Accordingly, the air blowing amount of the blower 32 approximates a largest value.

The air blowing amount of the blower 32 is reduced by reducing the blower level f(TAO) with increase of the target blowing temperature TAO from the extremely low temperature range toward an intermediate temperature range, or by reducing the blower level f(TAO) reduced with increase of the target blowing temperature TAO from the extremely high temperature range toward the intermediate temperature range. When the target blowing temperature TAO falls within the intermediate temperature range, the air blowing amount of the blower 32 approximates a smallest value by making the blower level f(TAO) close to a smallest value.

At step S64, the air-conditioning controller 50 determines the blower-motor voltage applied actually to the electric motor of the blower 32 based on the blower level f(TAO) determined at step S63 with reference to a control map stored in a ROM of the air-conditioning controller 50. Subsequently, the air-conditioning controller 50 proceeds to step S7.

Figure 3:
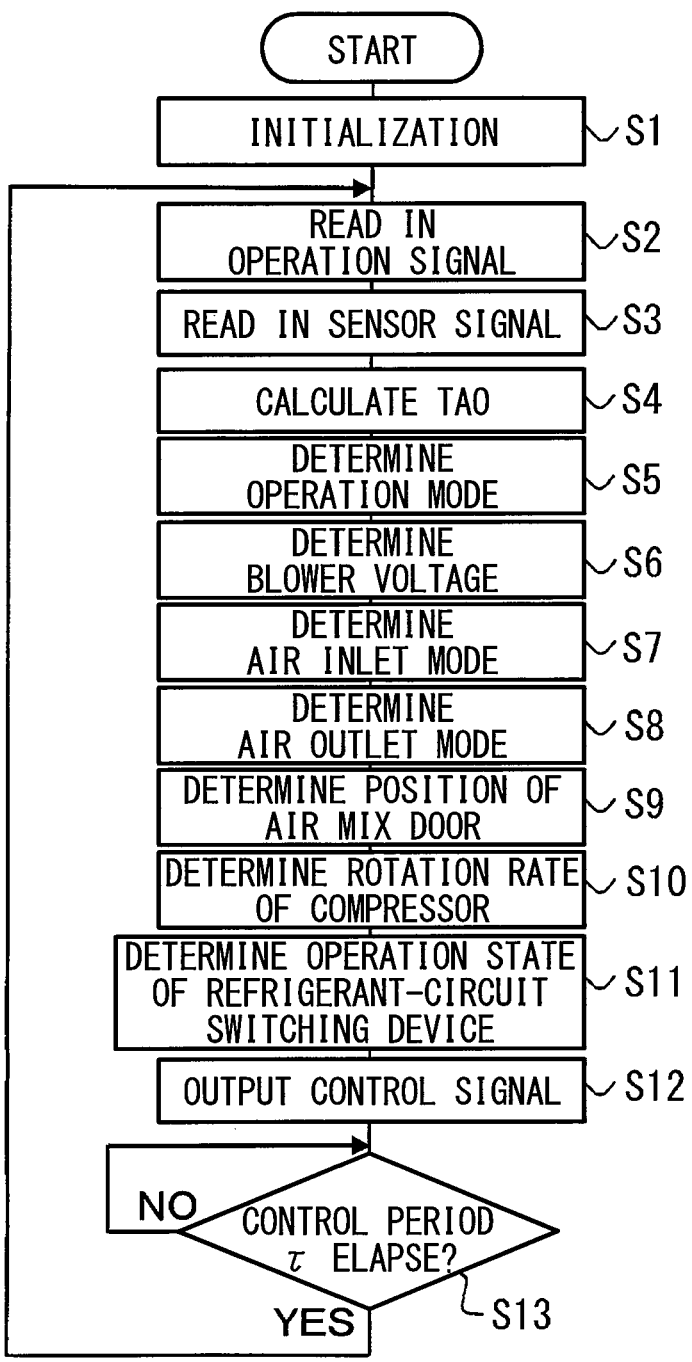
FIG. 3 is a flowchart showing a control processing of the vehicle air conditioner according to the embodiment.

Next, at step S7 shown in FIG. 3, the air-conditioning controller 50 determines an air inlet mode, i.e. a control signal outputted to the electric actuator 62 for the inside-outside switching door. The air inlet mode is also determined based on the target blowing temperature TAO with reference to a control map stored in the air-conditioning controller 50. In the present embodiment, an outside air mode, in which the outside air is introduced, is selected basically and preferentially, but an inside air mode, in which the inside air is introduced, is selected, for example, when a high cooling capacity is required in the extremely low temperature range of the target blowing temperature TAO.

At step S8, the air-conditioning controller 50 determines the air outlet mode, i.e. a control signal outputted to the electric actuator 64 for driving the air-outlet-mode doors. The air outlet mode is also determined based on the target blowing temperature TAO with reference to a control map stored in, the air-conditioning controller 50. In the present embodiment, the air outlet mode is switched in an order: the face mode, the bi-level mode and the foot mode, with increase of the target blowing temperature TAO from the low temperature range to the high temperature range.

Therefore, the face mode is mainly selected in a summer season in which the target blowing temperature TAO is likely to fall within the low temperature range. The bi-level mode is mainly selected in a spring or autumn season in which the target blowing temperature TAO is likely to fall within the intermediate temperature range. The foot mode is mainly selected in a winter season in which the target blowing temperature TAO is likely to fall within the high temperature range.

Further, a humidity detector that detects a relative humidity in a vicinity of a vehicle glass window may be provided. When it is determined based on a relative humidity on a surface of the glass window, calculated from a detection value of the humidity detector, that there is a high possibility of fogging of the glass window, a foot defroster mode or the defroster mode may be selected.

At step S9, the air-conditioning controller 50 determines an opening degree of the air mix door 34, i.e. a control signal outputted to the electric actuator 63 for driving the air mix door. In the present embodiment, in the heating mode, the air mix door 34 is changed in position such that an entire flowing amount of the blown air that has passed through the inside evaporator 18 flows into the inside condenser 13, the heater core 21 and the PTC heater 22.

In the defrosting mode, the air mix door 34 is changed in position such that the entire flowing amount of the blown air that has passed through the inside evaporator 18 bypasses the inside condenser 13, the heater core 21 and the PTC heater 22. In the cooling mode, the air mix door 34 is changed in position such that a temperature (in-vehicle-compartment air blowing temperature) of air blown into the vehicle compartment approaches the target blowing temperature TAO.

In the present embodiment, a value calculated from the evaporator temperature TE and the refrigerant discharging temperature is used as the in-vehicle-compartment air blowing temperature. In addition, an air blowing temperature detector that detects the in-vehicle-compartment air blowing temperature may be provided, and a value detected by the air blowing temperature detector may be used as the in-vehicle-compartment air blowing temperature.

At step S10, the air-conditioning controller 50 determines a refrigerant discharge capacity of the compressor 11, i.e. a rotation rate of the compressor 11. A basic method of determining the rotation rate of the compressor 11 will be described. For example, in the cooling mode, the air-conditioning controller 50 determines a target blowing temperature TEO of the refrigerant evaporation temperature TE (evaporator temperature) in the inside evaporator 18 based on the target blowing temperature TAO determined at step S5 with reference to a control map stored in the air-conditioning controller 50.

The air-conditioning controller 50 calculates a deviation En (TEO−TE) between the target blowing temperature TEO and the air blowing temperature TE, and obtains a rotation rate change Δf_C from a last compressor rotation rate fCn−1 by using a deviation change rate Edot (En−(En−1)), which is obtained by subtracting a last calculated deviation En−1 from a presently calculated deviation En, based on the fuzzy inference using a membership function and a rule stored in the air-conditioning controller 50.

In the heating mode, the air-conditioning controller 50 determines a target high pressure PDO of the refrigerant discharging pressure Pd (high pressure-side refrigerant pressure) based on the target blowing temperature TAO determined at step S5 with reference to a control map stored in the air-conditioning controller 50.

The air-conditioning controller 50 calculates a deviation Pn (PDO−Pd) between the target high pressure PDO and the refrigerant discharging pressure Pd, and obtains a rotation rate change Δf_H from a last compressor rotation rate fHn−1 by using a deviation change rate Pdot (Pn−(Pn−1)), which is obtained by subtracting a last calculated deviation Pn−1 from a presently calculated deviation Pn, based on the fuzzy inference using a membership function and a rule stored in the air-conditioning controller 50.

Figure 6:
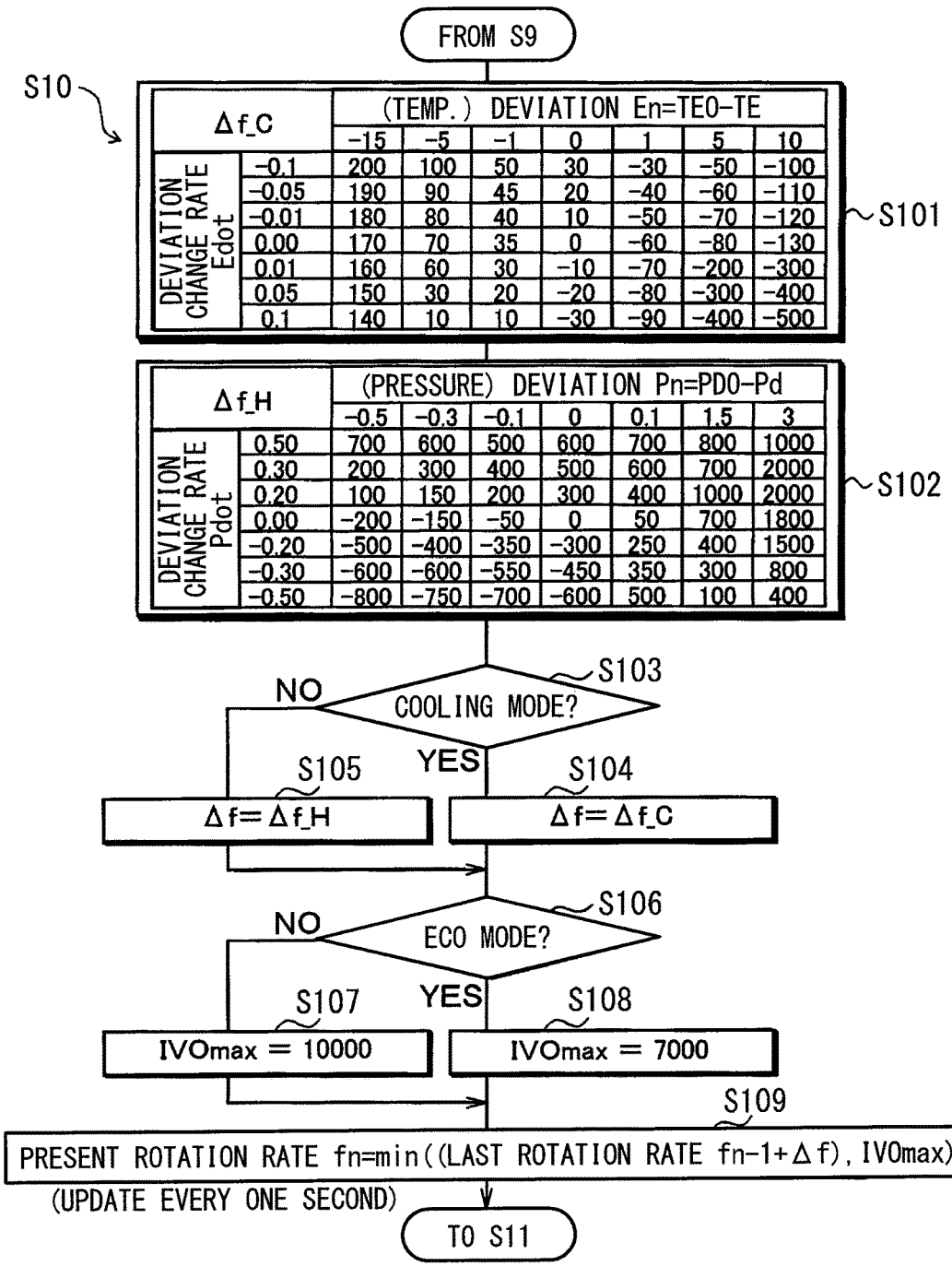
FIG. 6 is a flowchart showing a part of the control processing of the vehicle air conditioner according to the embodiment.

Detailed controls at step S10 will be described referring to FIG. 6. Firstly, at step S101, the rotation rate change Δf_C of the cooling mode is calculated. In step S101 of FIG. 6, a fuzzy rule chart used for the rule is described. By this rule chart, the rotation rate change Δf_C is determined based on the deviation En and the deviation change rate Edot described above so that the inside evaporator 18 is prevented from being frosted.

At step S102, the rotation rate change Δf_H of the heating mode and the defrosting mode is calculated. In step S102 of FIG. 6, a fuzzy rule chart used for the rule is described. By this rule chart, the rotation rate change Δf_H is determined based on the deviation Pn and the deviation change rate Pdot described above so that the high pressure-side refrigerant pressure Pd is prevented from rising abnormally.

Next, at step S103, the air-conditioning controller 50 determines whether the operation mode determined at step S5 is the cooling mode. At step S103, when the operation mode determined at step S5 is determined to be the cooling mode, the air-conditioning controller 50 proceeds to step S104 and determines the rotation rate change Δf_C to be a rotation rate change Δf of the compressor 11, and subsequently proceeds to step S106.

When the operation mode determined at step S5 is determined not to be the cooling mode at step S103, the air-conditioning controller 50 proceeds to step S105 and determines the rotation rate change Δf_H to be the rotation rate change Δf of the compressor 11, and subsequently proceeds to step S106.

At step S106, the air-conditioning controller 50 determines whether the economy switch of the operation panel 60 is turned on. At step S106, when the economy switch is not turned on, the air-conditioning controller 50 proceeds to step S107 and sets an upper limit value IVOmax of the rotation rate of the compressor 11 to 10000 rpm. When the economy switch is turned on, the air-conditioning controller 50 proceeds to step S108 and sets the upper limit value IVOmax of the rotation rate of the compressor 11 to 7000 rpm.

At next step S109, the air-conditioning controller 50 makes a comparison between a value, which is obtained by adding the rotation rate change Δf to a last compressor rotation rate fn−1, and the upper limit value IVOmax of the rotation rate of the compressor 11. The air-conditioning controller 50 determines the lower value to be a present compressor rotation rate fn and proceeds to step S11. The determination of the compressor rotation rate fn at step S10 is not executed with a repetition control period T of the main routine of FIG. 3, but executed at predetermined control intervals (1 second in the present embodiment).

Next, at step S11 shown in FIG. 3, the air-conditioning controller 50 determines an operation state of the refrigerant-circuit switching device, i.e. operation states of the open-close valve 15*a* and the three-way valve 20. More specifically, as described above, the open-close valve 15*a* of the present embodiment is open in the cooling mode and the defrosting mode or is closed in the heating mode.

The three-way valve 20 selects a refrigerant circuit connecting the refrigerant outlet side of the outside heat exchanger 16 and the cooling fixed throttle 17 in the cooling mode, or selects a refrigerant circuit connecting the refrigerant outlet side of the outside heat exchanger 16 and the refrigerant inlet side of the accumulator 19 that is disposed on the suction port side of the compressor 11.

At step S12, the air-conditioning controller 50 outputs control signals and control voltages to the respective air-conditioning components 11(61), 15*a*, 20, 16*a*, 32, 62-64 so as to provide control states determined at above-described steps S6 to S12. At next step S13, the air-conditioning controller 50 waits during the control period τ and returns to step S3 when the control period τ is determined to have elapsed.

Since the control processing is executed as described above, the vehicle air conditioner 1 of the present embodiment operates in accordance with the operation mode as below.

(a) Heating Mode

In the heating mode, the refrigerant circuit of the heat pump cycle 10 is switched to a refrigerant circuit in which the refrigerant circulates in an order: the compressor 11, the inside condenser 13, the heating fixed throttle 14, the outside heat exchanger 16, (the three-way valve 20), the accumulator and the compressor 11, as shown by the white arrows of FIG. 1. That is, a refrigeration cycle is configured such that the inside condenser 13 functions as a radiator, and the outside heat exchanger 16 functions as an evaporator.

Therefore, in the heat pump cycle 10 in the heating mode, the refrigerant compressed by the compressor 11 radiates heat to the blown air blown by the blower 32 in the inside condenser 13. Accordingly, the blown air passing through the inside condenser 13 is heated, and heating in the vehicle compartment is achieved. The refrigerant flowing out of the inside condenser 13 is decompressed by the heating fixed throttle 14 and flows into the outside heat exchanger 16.

The refrigerant flowing into the outside heat exchanger 16 evaporates by absorbing heat from the air outside the vehicle compartment blown by the blower fan 16a. The refrigerant flowing out of the outside heat exchanger 16 flows into the accumulator 19 through the three-way valve 20. A gas refrigerant resulted from gas-liquid separation of the accumulator 19 is drawn into the compressor 11 to be compressed newly.

As described above, in the heating mode of the present embodiment, the refrigerant-circuit controller 50a switches the three-way valve 20 so as to prevent the refrigerant from flowing into the inside evaporator 18. Thus, the blown air is not cooled in the inside evaporator 18. Therefore, the heating mode of the present embodiment is an operation mode corresponding to a non-cooling mode in which the blown air passes through the inside evaporator 18 without being cooled in the inside evaporator 18.

(b) Cooling Mode

In the cooling mode, the refrigerant circuit of the heat pump cycle 10 is configured to be a refrigeration cycle in which the refrigerant circulates in an order: the compressor 11, the inside condenser 13, (the bypass passage 15), the outside heat exchanger 16, (the three-way valve 20), the cooling fixed throttle 17, the inside evaporator 18, the accumulator 19 and the compressor 11, as shown by the black arrows of FIG. 1. That is, a refrigeration cycle is configured such that the inside condenser 13 and the outside heat exchanger 16 function as a radiator that radiates heat to the refrigerant, and the inside evaporator 18 functions as an evaporator that evaporates the refrigerant.

Therefore, in the heat pump cycle 10 in the cooling mode, the high-pressure and high-temperature refrigerant compressed in the compressor 11 exchanges heat in the inside condenser 13 with a part of the blown air that has passed through the inside evaporator 18. The part of the blown air is heated accordingly. Further, the refrigerant flowing out of the inside evaporator 18 flows into the outside heat exchanger 16 through the bypass passage 15 and radiates heat in the outside heat exchanger 16 via heat exchange with the outside air blown by the blower fan 16a.

The refrigerant flowing out of the outside heat exchanger 16 flows into the cooling fixed throttle 17 through the three-way valve 20 and is decompressed and expanded in the cooling fixed throttle 17. The low-pressure refrigerant decompressed in the cooling fixed throttle 17 flows into the inside evaporator 18 and evaporates by absorbing heat from the blown air blown by the blower 32. By a heat absorbing action of the refrigerant, the blown air passing through the inside evaporator 18 is cooled.

As described above, since a part of the blown air that has been cooled in the inside evaporator 18 is heated in the inside condenser 13, a temperature of the blown air that is to be blown into the vehicle compartment is adjusted to approach the target blowing temperature TAO. Accordingly, cooling in the vehicle compartment is achieved. The refrigerant flowing out of the inside evaporator 18 enters the accumulator 19. A gas refrigerant resulted from gas-liquid separation of the accumulator 19 is drawn into the compressor 11 to be compressed newly.

As described above, in the cooling mode of the present embodiment, the blown air is cooled by evaporation of the refrigerant in the inside evaporator 18. Therefore, the cooling mode of the present embodiment is an operation mode corresponding to a cooling mode in which the blown air is cooled in the inside evaporator 18.

(c) Defrosting Mode

The defrosting mode is performed when the outside heat exchanger 16 is determined to be frosted at control steps S502 and S506 that are used as a frosting determination device, and when a preliminary air conditioning starts or is in operation. In the present embodiment, once the defrosting mode is selected, the defrosting mode is not switched into another operation mode until a predetermined time (5 minutes in the present embodiment) elapses.

In the defrosting mode, the refrigerant circuit of the heat pump cycle 10 is configured to be a hot gas cycle in which the refrigerant circulates in an order: the compressor 11, (the inside condenser 13, the bypass passage 15), the outside heat exchanger 16, (the three-way valve 20), the accumulator 19 and the compressor 11, as shown by the crosshatched arrows of FIG. 1.

In the defrosting mode, an operation of the air mix door 34 is controlled such that an entire flow amount of the blown air bypasses the inside condenser 13. Thus, the refrigerant radiates heat very little in the inside condenser 13. Therefore, the heating in the vehicle compartment due to heating of the blown air in the inside condenser 13 does not be achieved.

Therefore, in the heat pump cycle 10 in the defrosting mode, the high-pressure and high-temperature refrigerant compressed in the compressor 11 flows into the outside heat exchanger 16 and radiates heat. Accordingly, the outside heat exchanger 16 is heated, and defrosting of the outside heat exchanger 16 is achieved. The refrigerant flowing out of the outside heat exchanger 16 flows into the accumulator 19 through the three-way valve 20. A gas refrigerant resulted from gas-liquid separation of the accumulator 19 is drawn into the compressor 11.

As described above, in the defrosting mode of the present embodiment, the refrigerant-circuit controller 50a switches the three-way valve 20 so as to prevent the refrigerant from flowing into the inside evaporator 18. Thus, the blown air is not cooled in the inside evaporator 18. Therefore, the defrosting mode of the present embodiment is an operation mode corresponding to the non-cooling mode in which the blown air passes through the inside evaporator 18 without being cooled in the inside evaporator 18.

The vehicle air conditioner 1 of the present embodiment operates as described above and is capable of achieving the cooling or the heating in the vehicle compartment. In addition, the vehicle air conditioner 1 is capable of defrosting the outside heat exchanger 16 by operating in the defrosting mode when the outside heat exchanger 16 is frosted. When the economy switch is turned on, a consumed energy for air conditioning in the vehicle compartment can be reduced by lowering the upper limit value IVOmax of the rotation rate of the compressor 11.

Moreover, in the vehicle air conditioner 1 of the present embodiment, as described with respect to control step S5, after the refrigerant circuit of the heating mode is selected in a predetermined time period (more specifically, after the heat pump cycle 10 starts), the refrigerant-circuit controller 50a executes the cooling-mode unallowable control that prohibits the refrigerant circuit from switching into the refrigerant circuit of the cooling mode.

Hence, the switching from the refrigerant circuit of the cooling mode to the refrigerant circuit of the heating mode can be prevented, and thus window fogging or odor generation caused by evaporation of condensed water attached to the inside evaporator 18 can be prevented.

As described with respect to control step S5, when the refrigerant circuit of the cooling mode is selected, the indicator of the air conditioner switch 60a is turned off (blacked out). When the cooling-mode unallowable control is performed, the indicator of the air conditioner switch 60a is turned on (lighted up).

Hence, an occupant can be informed that the cooling-mode unallowable control is being executed, and the occupant can know an operation state of the heat pump cycle 10 accordingly.

Other Embodiments

The present disclosure is not limited to the above-described embodiment, and can be modified variously as below.

(1) In the above-described embodiment, the predetermined time period, in which a determination (referred to as a cooling-mode unallowable determination, hereinafter) whether the cooling-mode unallowable control is executed is performed, is set to a time period that starts from a start of operation of the heat pump cycle 10, but is not limited to this.

For example, the cooling-mode unallowable determination may be performed after the ignition switch is turned on, or the cooling-mode unallowable determination may be performed after a predetermined time has elapsed since the ignition switch is turned on.

Alternatively, the cooling-mode unallowable determination may be performed after a predetermined time has elapsed since the refrigerant circuit of the heating mode is selected, or the cooling-mode unallowable determination may be performed after the automating switch provided on the operation panel is turned on.

(2) The cooling-mode unallowable control may be terminated when the cooling-mode unallowable control is being performed and when a predetermined condition is satisfied. Accordingly, the refrigerant circuit of the cooling mode can be selected depending on various situations.

The following various conditions may be used as the predetermined condition for the termination of the cooling-mode unallowable control. For example, when an occupant operates a predetermined air-conditioning control switch provided on the operation panel, the cooling-mode unallowable control may be terminated. When a predetermined time has elapsed since the cooling-mode unallowable control is selected, the cooling-mode unallowable control may be terminated.

When the outside air temperature becomes extremely high with exceeding a predetermined temperature so that the heating is not required any more, the cooling-mode unallowable control may be terminated. When the target blowing temperature TAO decreases below a predetermined temperature and departs from the heating region shown in the control characteristic diagram of step S504 of FIG. 4 so that the cooling mode is forced to be performed, the cooling-mode unallowable control may be terminated.

(3) In the above-described embodiment, the indicator (display device) is provided on the air conditioner switch 60a for informing an occupant whether the inside evaporator 18 cools the blown air. However, the indicator may be provided separately from the air conditioner switch 60a.

In the above-described embodiment, the indicator is lighted up in a state where the inside evaporator 18 cools the blown air and is blacked out in a state where the inside evaporator 18 does not cool the blown air. However, without limiting to this, a display pattern of the indicator may be changed between the state in which the inside evaporator 18 cools the blown air and the state in which the inside evaporator 18 does not cool the blown air. For example, the indicator may be blinked in the state in which the inside evaporator 18 does not cool the blown air.

(4) An example in which the electric compressor is used as the compressor 11 is described above, but the type of the compressor 11 is not limited to this. For example, the compressor 11 may obtain a driving force from the engine via a belt and an electromagnetic clutch. Therefore, the application of the vehicle air conditioner 1 of the present embodiment is not limited to an electric vehicle.

For example, the vehicle air conditioner 1 may be applied to a normal vehicle that runs by obtaining a driving force for running from an internal combustion engine (engine), a so-called hybrid vehicle that obtains a vehicle-running driving force from both the internal combustion engine and a for-running electric motor, and a so-called plug-in hybrid vehicle that is capable of storing an electric power, which is supplied from an external electric source (commercial power source), in a battery B at a stop time of the vehicle.

In the vehicle provided with the engine, a heating heat exchanger (heater core), which heats the blown air by using an engine coolant as a heat source, may be provided as an auxiliary heating device for the blown air in addition to the inside condenser 13.

(5) In the above-described embodiment, the refrigerant circuits of the heating mode, the cooling mode and the defrosting mode are described as switchable refrigerant circuits of the heat pump cycle 10. The heat pump cycle 10 is capable of selecting a refrigerant circuit of a dehumidifying-heating mode in which the blown air that has been cooled and dehumidified is reheated for dehumidifying and heating in the vehicle compartment.

More specifically, in the dehumidifying-heating mode, the open-close valve 15a that is an example of the refrigerant-circuit switching device is closed, and the three-way valve 20 is switched to select the refrigerant circuit that connects the refrigerant outlet side of the outside heat exchanger 16 and the cooling fixed throttle 17.

Accordingly, in the dehumidifying-heating mode, the refrigerant circuit of the heat pump cycle 10 is configured to be a refrigeration cycle in which the refrigerant circulates in an order: the compressor 11, the inside condenser 13, the heating fixed throttle 14, the outside heat exchanger 16, (the three-way valve 20), the cooling fixed throttle 17, the inside evaporator 18, the accumulator 19 and the compressor 11.

Therefore, in the heat pump cycle 10 in the dehumidifying-heating mode, the high-temperature and high-pressure refrigerant compressed in the compressor 11 exchanges heat in the inside condenser 13 with a part of the blown air that has passed through the inside evaporator 18. Accordingly, the part of the blown air is heated. Further, the refrigerant flowing out of the inside evaporator 18 is decompressed by the heating fixed throttle 14 and flows into the outside heat exchanger 16. The refrigerant flowing into the outside heat exchanger 16 radiates heat via heat exchange with the outside air blown by the blower fan 16*a*.

The refrigerant flowing out of the outside heat exchanger 16 flows into the cooling fixed throttle 17 through the three-way valve 20 and is decompressed and expanded in the cooling fixed throttle 17. The low-pressure refrigerant decompressed in the cooling fixed throttle 17 flows in to the inside evaporator 18 and evaporates by absorbing heat from the blown air blown by the blower 32. By the heat absorption action of the refrigerant, the blown air passing through the inside evaporator 18 is cooled and dehumidified. The succeeding operations are similar to those of the cooling mode.

As described above, in the dehumidifying-heating mode, the blown air is cooled by evaporation of the refrigerant in the inside evaporator 18 that is an example of the inside heat exchanger.

The invention claimed is:

1. A vehicle air conditioner comprising:
   a heat pump cycle including an inside heat exchanger performing heat exchange between a refrigerant and a blown air that is to be blown into a vehicle compartment, and a refrigerant-circuit switching device that switches between a refrigerant circuit of a cooling mode in which the blown air is cooled in the inside heat exchanger and a refrigerant circuit of a non-cooling mode in which the blown air passes through the inside heat exchanger without being cooled in the inside heat exchanger;
   a blower that blows air as the blown air into the vehicle compartment through the inside heat exchanger; and
   a refrigerant-circuit controller that selects the cooling mode or the non-cooling mode based on an air-conditioning load, the refrigerant-circuit controller controlling an operation of the refrigerant-circuit switching device, wherein
   upon selecting the non-cooling mode, the refrigerant-circuit controller turns a cooling unallowable flag on,
   only when the cooling unallowable flag is on, the refrigerant-circuit controller starts performing a cooling-mode unallowable control in which the refrigerant-circuit controller selects an air blowing mode instead of selecting the cooling mode, and
   in the air blowing mode, the blower blows the blown air into the vehicle compartment while the inside heat exchanger does not perform heating or cooling of the blown air.

2. The vehicle air conditioner according to claim 1, wherein the refrigerant-circuit controller terminates the cooling-mode unallowable control when the cooling-mode unallowable control is being performed, and when a predetermined condition is satisfied.

3. The vehicle air conditioner according to claim 1, further comprising a display device that displays
   a first sign when the refrigerant circuit of the cooling mode is selected, and
   a second sign when the cooling-mode unallowable control is performed, wherein
   the first sign is different from the second sign.

4. The vehicle air conditioner according to claim 1, wherein the refrigerant-circuit controller turns the cooling unallowable flag on upon selecting the non-cooling mode for the first time after a start of an operation of the heat pump cycle.

5. The vehicle air conditioner according to claim 1, wherein
   the refrigerant-circuit controller turns the cooling unallowable flag on upon selecting the non-cooling mode after an ignition switch of a vehicle is turned on.

6. The vehicle air conditioner according to claim 1, wherein the refrigerant-circuit controller turns the cooling unallowable flag on after a predetermined time has elapsed since the non-cooling mode is selected.

7. The vehicle air conditioner according to claim 2, wherein the refrigerant-circuit controller terminates the cooling-mode unallowable control when an occupant operates a predetermined air-conditioning control switch.

8. The vehicle air conditioner according to claim 2, wherein the refrigerant-circuit controller terminates the cooling-mode unallowable control when a predetermined time has elapsed since the cooling-mode unallowable control starts.

9. The vehicle air conditioner according to claim 2, wherein the refrigerant-circuit controller terminates the cooling-mode unallowable control when an outside air temperature exceeds a predetermined temperature.

10. The vehicle air conditioner according to claim 2, further comprising
    a target blowing temperature determination portion that determines a target blowing temperature of the air blown into the vehicle compartment, wherein
    the refrigerant-circuit controller terminates the cooling-mode unallowable control when the target blowing temperature of the air blown into the vehicle compartment falls below a predetermined temperature.

11. The vehicle air conditioner according to claim 1, wherein
    the refrigerant-circuit switching device includes a three-way valve provided upstream of the inside heat exchanger in a refrigerant flow, and
    the refrigerant-circuit controller switches the three-way valve in the non-cooling mode and prevents the refrigerant from flowing into the inside heat exchanger.

12. The vehicle air conditioner according to claim 1, wherein
    the heat pump cycle further includes a compressor that compresses and discharges the refrigerant to the inside heat exchanger, and
    the blower blows the blown air into the vehicle compartment while the compressor stops in the air blowing mode.

* * * * *